Oct. 3, 1967 E. B. EAMAN ET AL 3,344,623
BI-DIRECTIONAL FLOW CONTROL CONDUIT
Filed July 16, 1964

INVENTOR.
Edmund B. Eaman
William R. Rickel
BY Hill, Sherman, Meroni, Gross & Simpson
ATTORNEYS

United States Patent Office

3,344,623
Patented Oct. 3, 1967

3,344,623
BI-DIRECTIONAL FLOW CONTROL CONDUIT
Edmund B. Eaman, Benton Harbor, and William R. Rickel, St. Joseph, Mich., assignors to Whirlpool Corporation, Benton Harbor, Mich., a corporation of Delaware
Filed July 16, 1964, Ser. No. 383,084
5 Claims. (Cl. 68—12)

ABSTRACT OF THE DISCLOSURE

A flow conduit made of elastic material exhibiting such properties and sized so that it will respond to changes in inlet pressures when connected to a reversible flow pump to collapse within predictable limits and thereby effect a bi-directional flow control through a single conduit.

---

In domestic washing machines of the automatic type, clothes are mechanically agitated in the presence of a laundry liquid. At the end of the washing operation, the laundry liquid is drained from the tub and then a series of rinses may be employed which, in turn, may be followed by a spin drying operation.

As the washing and rinsing operations progress, the laundry or rinsing liquid becomes laden with foreign matter which has soiled the clothes, and with particles of lint or the like which are loosened and removed from the fabrics. The presence of this foreign material and lint interferes with the efficient laundering and some of the lint and particles of soil may remain on the clothes or may be redeposited on the clothes. While lint filters and the like have been provided in the past, these have not been entirely effective since they have required constant attention and cleaning for continued operation.

In one form of filtering structure a self-cleaning filter consists of a so-called pebble-type filter wherein a bed of filter pellets is provided such as particles of materials such as glass, ceramic, thermosetting plastics, aluminum, rubber, gravel, stones, or other non-corrosive substances which are not chemically attacked by washing powders, bleaches, or other chemicals used in home laundry operations. The filter pellets or particles may be of substantially uniform size and do not have sharp edges or contours which could permanently entrap lint or other foreign matter. Round, oval, or conical shaped particles have been advantageously employed for this purpose. The pellets or particles are supplied in a quantity which will not fill the filtering chamber.

The pebble-type filter is embodied in a flow control system embodying a reversible flow pump. During the filtering operation, the lint laden fluid is drawn through the filter by pumping the fluid in the direction in which the particles of the filtering mass are collected at one end of the filter chamber to form a filter bed, thereby permitting the fluid to be drawn through the filter bed to remove foreign particles from the stream and then delivering the filtered liquid back into the tub. When the direction of water flow is reversed during a draining operation the fluid is pumped under a positive pressure from the pump into the filtering chamber where the filtering elements are dispersed throughout the filtering chamber and washed free of the separated foreign matter, and the resultant purging stream is then passed to a suitable drain.

While the system described provides an efficient filtering action without the disadvantages of cleaning usually associated with lint traps and the like, it has been found that in some instances the flow rates through the filtering bed during the filtering operation can become excessive. When this happens, there is an undue amount of turbulence created in the filtering bed with the result that the pellets or particulate filtering elements are agitated. Thus, the continuity of the filter bed is disturbed and an inefficient filtering action may occur. Merely cutting down the discharge rate of the pump would not be a completely satisfactory solution, since it is desired to have a relatively high discharge rate in the pump to secure efficient washing and purging of the filter elements during that portion of the cycle.

The present invention provides a means for automatically modifying the pump flow rate during filtering flow in one direction and yet obtaining full capacity flow in an opposite direction during purging without changing the essential characteristics of the pump or without requiring a complicated control system for regulating flow. With the assembly of the present invention, therefore, the pump when operating in one direction serves to provide a suitable amount of suction on the filter assembly to draw the washing liquid through the filter elements at a convenient rate to secure good filtering action but in the reverse cycle supplies liquid under positive pressure to the filtering element with sufficient force to wash off contaminants and deliver them to the drain.

An object of the present invention is to provide a bi-directional flow control conduit for a washing machine and the like which automatically restricts the flow rate of the liquid through a filter during filtering, while permitting a high reverse flow rate through the filtering bed in an opposite direction.

Another object of the invention is to provide an improved flow control conduit for use with a pebble-type filter assembly which is automatically responsive to negative pressure conditions to restrict the flow rate through the filter under such conditions.

Still another object of the invention is to provide an improved inexpensive and convenient means for regulating flow rate through a filter in both directions.

In accordance with the present invention, we provide a washing machine assembly having a treatment zone and a self-cleaning filter such as a so-called pebble filter. A reversible flow pump having reversible inlet and outlet ports drives the laundry liquid and rinsing liquid through the filter and back to the treatment zone during recirculation or through the filter and to drain during reverse flow.

In accordance with this invention, a flexible, resilient conduit is interposed between the pump and the filter. The flexible conduit is constructed of a material of such a durometer and other physical properties and is sized to be sufficiently flexible or elastic that it is necked down substantially when the pump is operating to draw fluid through the filter during a filtering operation thereby reducing the fluid flow rate through the filter.

In reverse direction, when positive internal pressure is applied to the conduit, the conduit is somewhat expanded, thereby permitting a maximum flow rate through the filter in this condition. Typically, the fluid flow through the conduit is reduced by at least ⅓ when subjected to negative internal pressure as compared with the flow during application of positive pressure to the conduit.

A further description of the present invention will be made in conjunction with the attached sheet of drawings which illustrates a preferred embodiment thereof.

Figure 1:
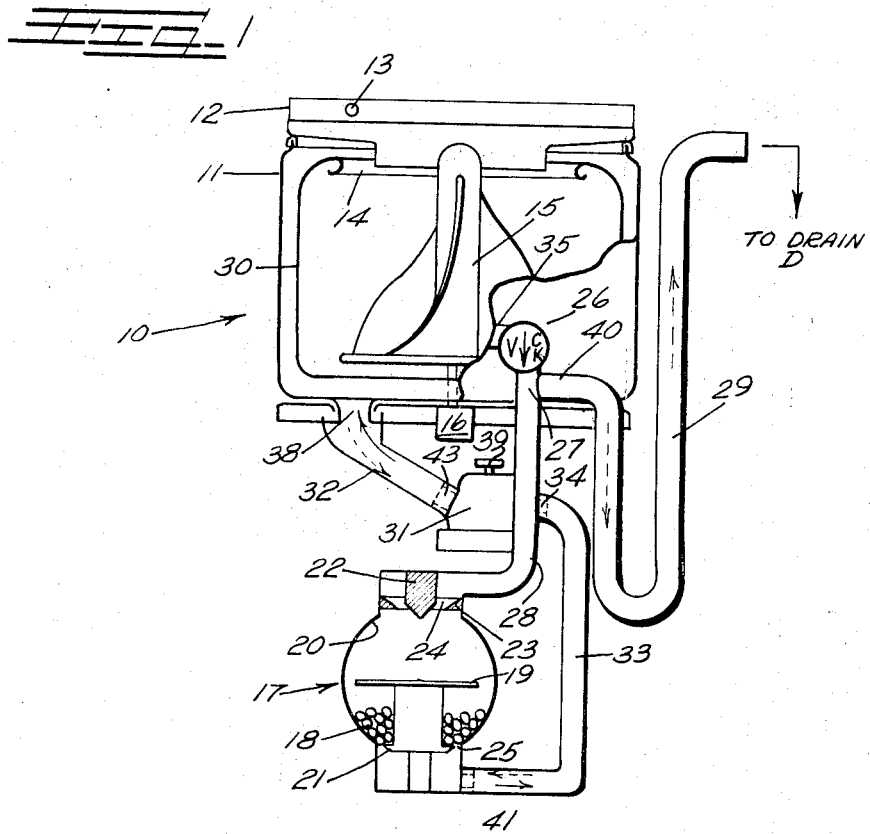
FIGURE 1 is a somewhat schematic view of a washing machine assembly embodying the improvements of the present invention.

In FIGURE 1, reference numeral 10 indicates generally a washing machine assembly of the type to which the improvements of the present invention can be readily applied. The washing machine 10 includes an outer casing 11 and a control panel 12 on which there is a control knob of a pre-settable sequential control means 13 for automatically operating the machine through a series of washing, rinsing, draining and extracting periods and drying steps of a programmed cycle. It will be understood that the principles of the present invention are generally appicable to any laundry machine whether a vertical axis or horizontal axis type and whether an automatic washer, a wringer washer, or a combination washer-dryer. The interior of the exemplary machine herein described by way of example includes a perforate tub 14 in which there is disposed an agitator 15 driven by means of a drive means generally indicated at numeral 16 in the drawings.

The filtering assembly is generally indicated at numeral 17 in the drawings. The filtering elements consist of particulate, mobile elements such as pellets or glass balls 18 disposed within a filtering chamber 20. The pellets or balls 18 do not fill the chamber 20 and are normally gravitationally biased towards the lower end of the chamber, thereby to form a filter bed having a tortuous flow path prescribed by the voids between the pellets or balls 18. An annular baffle 21 at the end of the chamber 20 restrains the pellets or balls 18 from removal while forming with the walls of the chamber 20 an annular opening 25 through which laundry liquid flows at the bottom of the filtering assembly 17.

The upper end of the filtering assembly 17 includes a filter cap 22 disposed within an annular retaining ring or baffle 23, while leaving an opening 24 therein. An intermediate baffle 19 is disposed in alignment with the opening 24 and intercepts the stream of fluid entering the opening 24 to disperse the liquid.

A tub 30 forms a treatment zone in which the washing, rinsing and drying steps are carried out. If recirculation of either laundry or rinsing liquid is desired, or if the liquid is to be discharged to drain, a hydraulic circuit is provided which includes a conduit 26 connected to the tub 30 as at 35. A conduit 32 is connected between the tub as at 38 and a bi-directional pump 31 driven via a mechanical driving connection 39 to the drive means 16. A check valve 27 permits one-way flow of the washing liquid out of the conduit 26 and into a conduit 28 which connects the conduit 26 to the top side of the filter assembly 17. A drain conduit 29 is provided for carrying off the lint laden stream of washing liquid from the filter for disposal purposes and is connected to the conduit 28 at a Y junction 40.

In accordance with the principles of the present invention, the hydraulic circuit of the machine is particularly characterized by the use of a flexible elastic conduit between the pump 31 and the filter assembly 17 and which conduit is shown generally at 33. The pump 31 has reversible inlet and outlet openings shown at 34, 43 respectively and the conduit 33 is connected at one end to one of the reversible openings 34 and is placed in firm assembly therewith by a clamping device 36. The other end of the conduit 33 is connected to the lower end of the filter assembly 17 as at 41.

The characteristics of the conduit 33 are such that when a negative pressure is applied from the pump 31, i.e., when the lint laden washing liquid fluid is being drawn in the direction of the solid line arrows through the filter 17, the conduit 33 is constricted as indicated at numeral 37 thereby significantly reducing the flow rate through the conduit. We have found that making the conduit 33 of a synthetic resin material of suitable flexibility and softness provides a constriction in cross sectional area resulting in a reduction in flow of at least ⅓ as compared to the flow possible through the conduit 33 in the reverse direction.

In a specific embodiment of the invention, we use a conduit having a 1″ inner diameter, and a wall thickness of 0.125″. The durometer rating of the material is between 55 and 70 points (Shore A). The conduit is composed of polyvinyl chloride having a tensile strength of 1500 to 1600 pounds per square inch. When the conduit is subjected to conditions of negative pressure for filtering, at a water temperature of 130 to 160° F., and at a negative pressure of −3.75 to −4.0 p.s.i. gauge, the flow through the conduit ranges from 3.5 to 6.0 gallons per minute. When the direction of pumping is reversed as shown by the dotted line arrows, and the positive pressure is supplied through the pump 31, the static pressure is 1.0 to 1.5 p.s.i. gauge and the flow amounts to 10 to 12 gallons per minute.

In the agitation period of the cycle, during the normal circulation of the laundry or rinsing liquid, the liquid is received through the opening 24 of the filter 17, and passes through the filter bed of glass balls 18 by virtue of the negative pressure being applied through the conduit 33 by the pump 31. The elasticity or resiliency characteristics of the conduit 33 are such that this condition of negative pressure causes a constriction 37 to appear near one end of the conduit 33, thereby reducing the flow rate. Under these circumstances, the flow of washing liquid through the filter 17 is smooth and no undue turbulence is created which would agitate the filter bed 18 to such an extent that the effectiveness of the filter bed will be impaired.

Figures 2, 3:
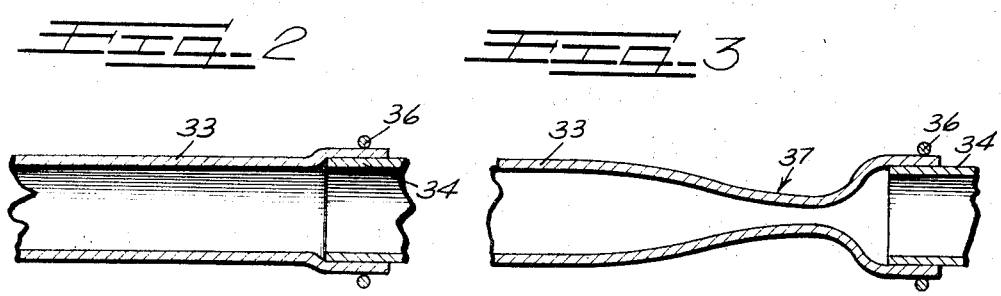
FIGURE 2 is a fragmentary view, in cross section, of the conduit during the application of positive pressure, i.e., during washing or purging of the filter elements.
FIGURE 3 is a view similar to FIGURE 2 but illustrating the condition of the conduit during the filtering action, and the manner in which the conduit is constricted by the application of negative pressure.

During the drain and centrifugal extraction periods of the cycle, when it is desired to flush out or purge the filtering elements 18 in the filter 17, the direction of pumping action of the pump 31 is reversed. The conduit 33 when under normal positive pressure is illustrated in FIGURE 2, and the laundry liquid or rinsing liquid is pumped through the filter 17 at substantially higher flow rates. This high velocity stream through the glass balls 18 causes them to be dispersed in the filter chamber 20 whereupon the lint and other foreign matter separated by the filter bed during the filtering operation will be entrained in the stream and the purging stream is then discharged to a suitable drain D through the conduit 29.

It should be evident that various modifications can be made to the described embodiments without departing from the scope of the present invention.

The embodiments of the invention in which an exclusive property or privilege is claimed are defined as follows:

1. A hydraulic circuit for a washing machine operable through an agitation period and a drain period comprising,
   a tub adapted to contain fluid during an agitation period,
   first and second outlets in said tub,
   conduit means interconnecting said first and second outlets,
   a drain conduit connected to said conduit means,
   filter means in said conduit means for filtering fluid passing therethrough,
   reversible flow pump means in said conduit means for pumping fluid at a first volume flow rate from said first outlet through said filter means and through said drain conduit during said drain period,
   a resilient hose included in said conduit means between said pump means and said filter means,
      said hose manufactured to have such resilient properties that it will partially collapse under negative internal pressure and thereby impede fluid flow through said filter means by at least ⅓ when under negative internal pressure and revert to a normal expanded condition when under positive internal pressure, and control means for reversing the flow through said pump means to effect flow through said second outlet, through said filter means, and through said partially collapsed hose to said tub at said reduced volume flow rate during said agitation period.

2. In a washing machine having a tub for receiving washing fluid, conduit means connected to said tub for providing a circulating flow path through said tub, filter means in said conduit means for filtering fluid passing therethrough, a drain hose connected to said conduit means providing for the drainage of fluid from said tub, pump means for circulating fluid in a first direction through said conduit means to effect filtration of said fluid and in a second direction to effect the drainage of fluid from said tub, a resilient hose included in said conduit means between said pump means and said filter means and manufactured to have such resilient properties that said hose will partially collapse under internal negative pressure and automatically reduce fluid flow through said hose in said first direction by at least ⅓ of the flow produced under internal positive pressure in said second direction, and revert to a normal expanded condition when under positive internal pressure.

3. In a washing machine including a tube for receiving a washing fluid, a filter having mobile filter elements therein, a conduit connecting said tub to said filter for delivering washing fluid from said tub to one side of said filter, check valve means in said conduit permitting flow from said tube to said filter, drain means arranged to drain fluid from said filter, reversible flow pump means having one side connected to said tub, and a flexible conduit means connecting the other side of said pump means to the other side of said filter, said flexible conduit means being manufactured to have resilient properties and being sufficiently flexible so that it is necked down substantially from its normally expanded condition under positive internal pressure when said pump means is operating to draw fluid through said filter and into said tub, thereby reducing the fluid flow rate through said filter by at least ⅓.

4. In a washing machine including a tub for receiving a washing fluid, a pebble-type filter, a conduit connecting said tub to said filter for delivering washng fluid from said tub to one side of said filter, drain means connected to said conduit to drain fluid therefrom, a reversible flow pump having one side connected to said tub, and a flexible conduit means connecting the other side of said pump means to the other side of said filter, said flexible conduit means being manufactured to be sufficiently flexible so that it is necked down substantially from expanded condition under positive internal pressure when said pump means is operating to draw fluid through said filter and into said tub, thereby reducing the fluid flow rate through said filter by at least ⅓.

5. The washing machine of claim 3 in which said hose is composed of a synthetic resin and manufactured to have a durometer reading of from about 55 to 70.

References Cited
UNITED STATES PATENTS

| | | | |
|---|---|---|---|
| 2,735,642 | 2/1956 | Norman | 138—45 X |
| 3,016,147 | 1/1962 | Cobb et al. | 210—275 |

REUBEN FRIEDMAN, *Primary Examiner.*

F. A. SPEAR, *Assistant Examiner.*

UNITED STATES PATENT OFFICE

CERTIFICATE OF CORRECTION

Patent No. 3,344,623            October 3, 1967

Edmund B. Eaman et al.

It is hereby certified that error appears in the above numbered patent requiring correction and that the said Letters Patent should read as corrected below.

Column 5, lines 30 and 37, for "tube", each occurrence, read -- tub --; column 6, line 18, after "pump" insert -- means --; line 24, after "from" insert -- its normally --.

Signed and sealed this 22nd day of October 1968.

(SEAL)
Attest:

Edward M. Fletcher, Jr.

Attesting Officer

EDWARD J. BRENNER

Commissioner of Patents